March 2, 1937.  E. C. BERNDT ET AL  2,072,416
METHOD OF IRRADIATING SUBSTANCES WITH ACTIVE RAYS
Original Filed Jan. 16, 1933   3 Sheets—Sheet 1
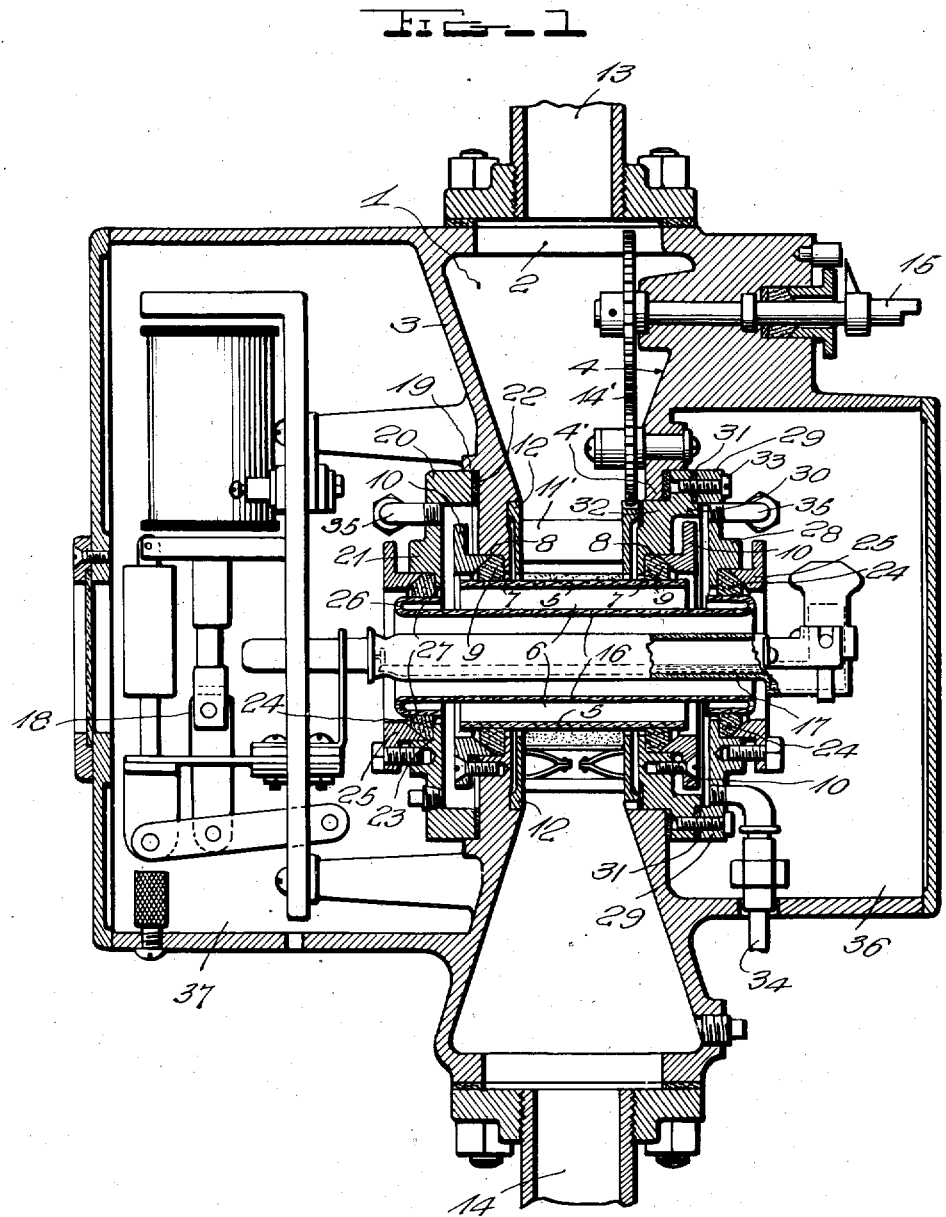
Inventors:
Edward C. Berndt,
Harry M. Creighton,
BY
Bohleber & Ledbetter.
ATTORNEYS.

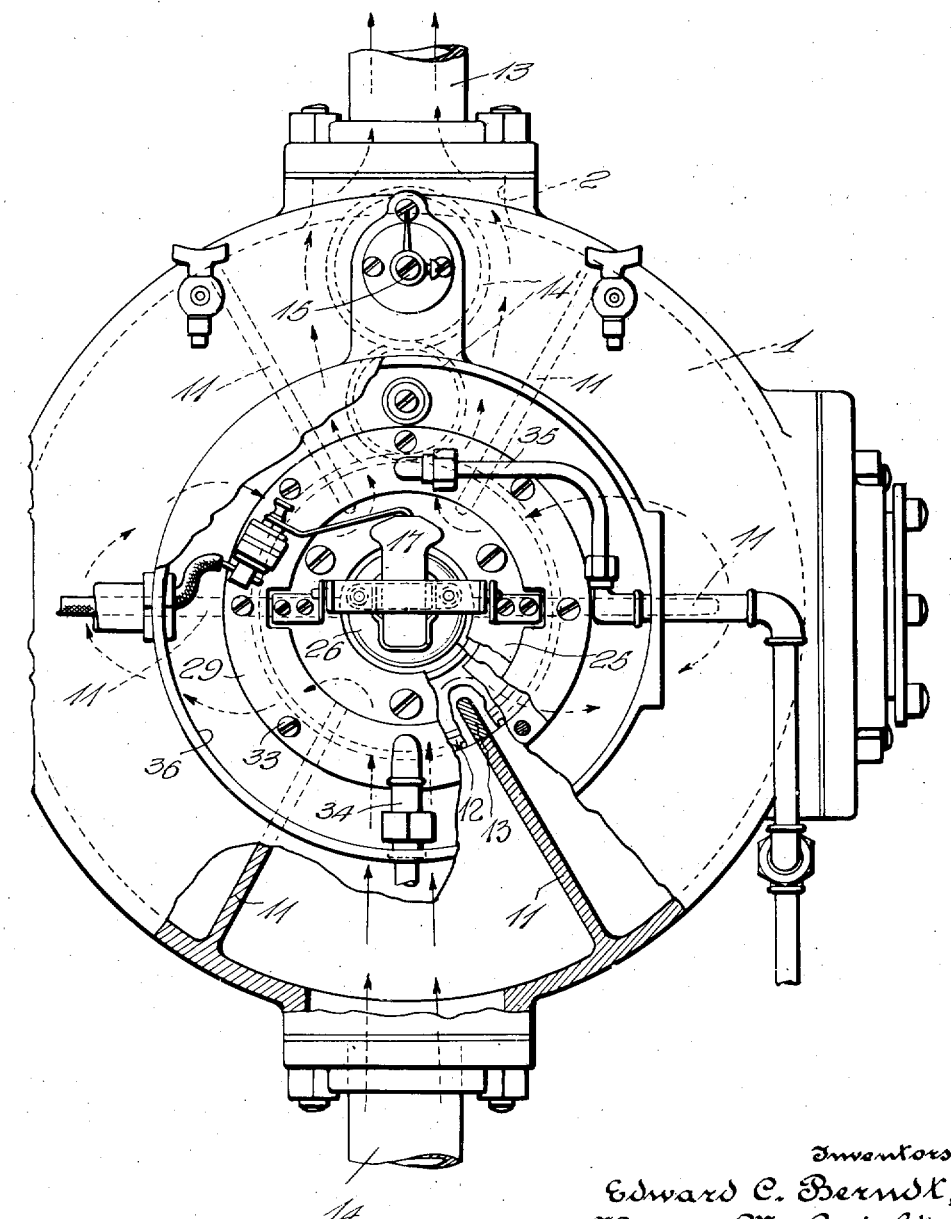

March 2, 1937. E. C. BERNDT ET AL 2,072,416
METHOD OF IRRADIATING SUBSTANCES WITH ACTIVE RAYS
Original Filed Jan. 16, 1933  3 Sheets—Sheet 3
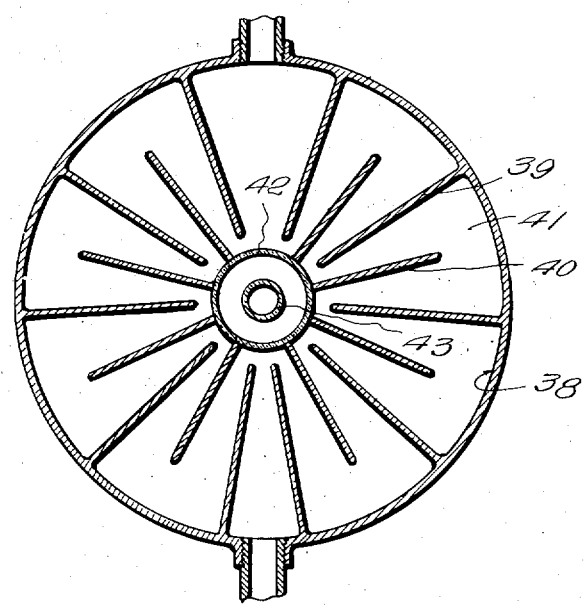
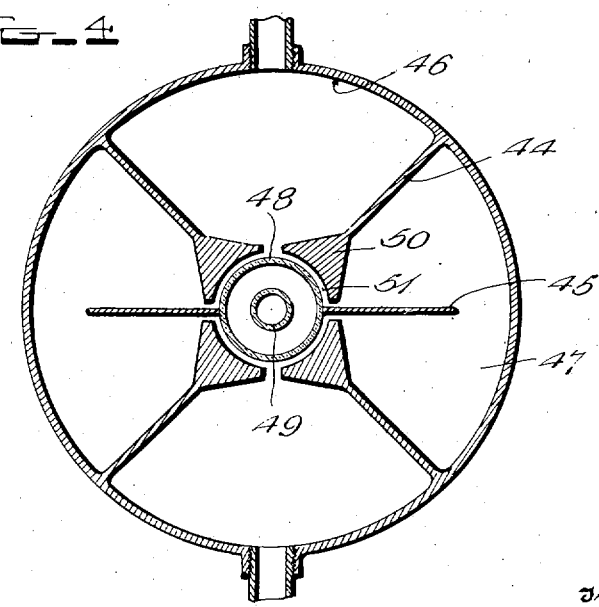
Inventors:
Edward C. Berndt,
Harry M. Creighton,
BY Bohleber & Ledbetter
ATTORNEYS.

Patented Mar. 2, 1937

2,072,416

UNITED STATES PATENT OFFICE 2,072,416

METHOD OF IRRADIATING SUBSTANCES WITH ACTIVE RAYS

Edward C. Berndt, Norwalk, and Harry M. Creighton, East Norwalk, Conn., assignors to R. U. V. Engineering Corporation, South Norwalk, Conn., a corporation of Delaware Application January 16, 1933, Serial No. 652,020
Renewed March 22, 1935

19 Claims. (Cl. 99—13)

This invention relates to the method of treating or irradiating substances with active rays, such as ultra-violet rays, to impart beneficial properties or effects thereto, and more particularly to the treatment of such substances which are susceptible of being injured during, or by the treatment thereof, with such active rays. Our method of treatment makes it possible to obtain the beneficial effects without detrimental effects, or to obtain the maximum beneficial effects with little, if any, detrimental effects, in a simpler, more efficient, and reliable manner than has heretofore been obtained by workers in this field.

It is well known that active rays, such as ultra-violet rays, have various effects on different substances. For example, these rays will kill bacteria and also impart to certain substances a property which is now called vitamin D. Active rays will also stimulate bacteria rather than kill them if the treatment is mild enough. Moreover, it has been found desirable to use these rays for the sterilization and/or activation of milk, fruit juices, malt products, beer and many other partially opaque substances. It is to be particularly noted that with this method milk can be sterilized with ultra-violet rays and at the same time the vitamin D effect produced therein. There are also cases where it is desirable to inactivate enzymes in substances, and in such cases the method to be hereinafter described is also applicable. There are also other reasons for the treatment of substances with active rays such as to produce beneficial chemical reactions or to irradiate oils and petroleum products to impart to them healing effects or other properties. However, the use of active rays may result in producing both detrimental and beneficial effects, and we have found it is highly important for the irradiation of a substance to be accurately controlled to produce the result desired.

An example of the importance of this control may best be illustrated in the consideration of the irradiation of milk. We know that the germs which infect and propagate in milk can be destroyed with ultra-violet rays. We further know these rays will activate or produce vitamin D in milk when it is irradiated. We also know that certain degrees of over-irradiation of portions of the milk, or particles therein, will change the taste, odor and other properties of the milk to such an extent that it may be impossible or actually dangerous to use it for human food. Hence, in the irradiation of milk it is highly important to accurately control the activation thereof in imparting thereto or inducing a vitamin D effect therein or in the irradiation thereof to sterilize the same, regardless of the degree of the result sought if the milk is to be used for food.

Although ultra-violet rays have been known to have a powerful destructive effect on bacteria, and although workers in this field have experimented with milk sterilization for many years, this use of ultra-violet rays has not, so far as we know, come into commercial use. This same holds true of other substances which are relatively opaque to ultra-violet rays. We have therefore developed a process or method of irradiation whereby the irradiation can be accurately controlled, and thus make possible the use of these active rays for both sterilization and activation and the many other purposes outlined above.

This application is a continuation in part of our patent application entitled Active ray treating devices, filed January 2, 1930, and serially numbered 418,027, Patent No. 2,024,207, granted December 17, 1935.

Accordingly, an object of our invention is to provide a process for treating substances with active rays, which process effectively activates all portions of the substance without depending upon the accuracy of personal supervision to activate the substance uniformly.

A further object of the invention is to provide a process of the above character in which the time of exposure of all portions of a substance is accurately controlled and regulated and enable one to design a device with which substances may be more efficiently treated without the aid of personal supervision.

A further object of the invention is to provide a process for effectively activating or treating substances of opaque or semi-opaque character, as well as substances bearing solids in suspension.

A further object of this invention is to provide a method of irradiating substances whereby the beneficial effects obtainable can be produced with a greater factor of safety against incidentally producing detrimental effects at the time of such treatment.

A further object is to provide a method of irradiating a substance wherein the maximum effectiveness of a given amount of radiant or irradiating a substance wherein maximum beneficial effects desired and provide a safety factor against the production of detrimental effects.

A further object is to provide a method of irradiating a substance wherein maximum beneficial effects can be produced with minimum detrimental effects; or a lesser degree of the beneficial effects, if desired, with a proportionately larger safety factor against producing detrimental effects.

An important object is to provide a method of irradiating milk to produce a high percentage of the potential amount of vitamin D effect in the milk without detrimental effects, such for example, as producing an unpleasant taste or odor therein.

A further object is to provide a method of irradiating milk to reduce the bacterial content to a safe limit and also to produce the vitamin D effect therein at the same time and cause only negligible detrimental effects, if any.

A further object is to provide a method of irradiating milk powder to activate the same for the purposes above set forth.

A further object is to provide a method of irradiating orange juice and other fruit juices to the reduce the bacteria, fermentation organisms or other organisms to a safe limit thus preventing fermentation or spoilage when properly sealed and stored in a suitable container and to simultaneously add vitamin D to said juices.

A further object is to provide a method of irradiating orange juice to kill bacteria and inactivate enzymes.

A further object of the method is to control the amount of ray energy acting upon different portions of the substance, and thereby control the results obtained, irrespective of whether the whole range of active ray energy available from a source of active rays is used, or rays of certain wave lengths selected from said range.

A further object of our invention is to provide a method of irradiating a substance with active ray energy whereby one is able to forecast the results to be obtained, when undefined fractional portions of the substance to be treated are successively irradiated.

A further object of our invention is to produce by irradiation with active rays a milk product which has been sterilized to a safe degree and also which has had imparted to it anti-rachitic properties or the vitamin D effect without appreciable change in the other properties of the milk thus providing a milk free from disease organisms and which is beneficial in combating or curing rickets or for other nutritional purposes.

Another object of our invention is to provide a method of irradiation whereby radiant energy in fractional amounts may be successively applied to a substance to produce a greater proportion of beneficial effects therein than is obtainable by applying the same amount of energy in a single treatment.

Another object is to provide a method of irradiation wherein the relation between the amounts of irradiation received by different portions of the substance can be computed.

Another object is to provide a method of utilizing high intensity active rays in the irradiation of substances which have heretofore been damaged by the use of such rays in the treatment thereof.

Another object is to provide a method of irradiation which permits the use of the more effective short active rays so as to safely utilize this energy when irradiating substances which are susceptible to detrimental effects.

Other objects of our invention will become apparent to those skilled in the art from the detailed description taken in connection with the accompanying drawings, in which, Fig. 1 is a view in vertical section, taken through the axis of a device for treating substances with ultra-violet rays, such devices being constructed in accordance with the present invention.

Fig. 2 is a view in end elevation, partly broken away and in section, showing the device of Fig. 1.

Fig. 3 is a view in section, taken transverse to the axis of a device constructed in a modified manner but embodying the principles of the present invention.

Fig. 4 is a view similar to Fig. 3, showing a further modified device in which the path of the substance being treated lies adjacent the enclosure for the source of active rays over an extended portion thereof.

Referring to the drawings in detail, and first to the construction illustrated in Figs. 1 and 2 thereof, reference numeral 1 designates a cylindrical chamber having a peripheral cylindrical wall 2 and end walls 3 and 4. Openings 13 and 14 afford a means for introducing a substance into the chamber and effecting the withdrawal of the substance therefrom. A supplemental wall 32 is carried by the wall 4, being secured within an annular recess 4', formed upon the outer surface of the wall 4. Cylindrical bores 7 are formed in the wall 3 and supplemental wall 32, these bores being adapted to receive a cylindrical tube 5 of quartz or other suitable material. Annular recesses 8, formed in the wall 3 and 32 receive annular packing 9, these packings being secured in position by glands 10 in an obvious manner. The cylindrical enclosure 5 is of such size as to afford a degree of clearance between the outer portion thereof and the bores 7, thus providing a type of cooperative relationship between the enclosure and walls 3 and 32 which has been found desirable.

A plurality of inwardly and outwardly extending radial baffles 11 are formed within the housing 1 and lie adjacent to a rotatable cage 12 carrying baffles 11', which are adapted to align with baffles 11. This cage is rotated by means of gears 14' and shaft 15 to clean the surface of the cylindrical enclosure 5. Since the subject matter of this cleaning mechanism forms the basis of a separate application Serial No. 336,807, filed February 1, 1929, Patent No. 2,000,377, granted May 7, 1935, further description thereof is believed to be unnecessary. It will thus be seen that the flow of fluid, or substance to be treated, is restricted by the baffles and the substance is thus coursed through the chamber 1 in a circuitous route repeatedly coming into close proximity with the enclosure 5.

The foregoing description is directed to a structure which provides an enclosed chamber 1 and a chamber 6 within the cylindrical closure 5. It is frequently desirable to provide a means for selecting the radiation from the source of active rays in addition to effecting the cooling of the packings carrying the tube 5. Such selective irradiation may be effected by using different solutions of filtering substances in the cooling medium, so as to adapt said medium for simultaneous cooling and filtering. For example, solutions of copper sulphate and lead acetate may be used. A second enclosure 16 is therefore provided within which a mercury vapor lamp 17 or other source of active rays is mounted. Tilting mechanism for the lamp is shown at 18. Within an annular recess 19 formed on the outer surface of the wall 3, the cylindrical flange 20 of a supporting member 21 is received. Packing 22 is provided to seal the joint between the supporting member and wall 3 and an annular recess 23 is provided in the outer portion of the supporting member to receive packing 24. This packing supports the tube 16 and is secured in position by means of a gland 25. The tube 16 is flared outwardly at 26 and is formed with a reversely extending cylindrical portion 27 which is engaged by the packing 24. The reentrant structure at the end of tube 16 thus affords a chamber between the packing 24 and the source of active rays 17. Within this chamber a suitable fluid may flow to effect the cooling of the joint or to obstruct the flow of the long rays of the spectrum.

The other end of the enclosure 16 is mounted in a supporting member 28 which is similar in construction to the supporting member 21. The cylindrical flange 29 is mounted over a corresponding flange 30 on the supplemental wall 32, packing 31 affording the desired joint between the supporting member 28 and the supplemental wall 32. The supporting member 28 is secured to the supplemental wall by means of bolts 33 in a well known fashion and carries packing 24 and gland 25 in a manner similar to the corresponding elements described in connection with the mounting of the other end of the tube 16.

A supply pipe 34 communicates with the chamber 6 formed between the concentric tubes 5 and 16 to introduce a substance thereinto. Pipes 35, connected at either end of the chamber and upon the sides thereof opposite from the pipe 34, carry away the substance and prevent stagnant pockets being formed in such chamber in which portions of the substance may lie.

Supplemental chambers 36 and 37 may be formed on the cylindrical housing to enclose the source of active rays and the specific structural characteristics of the device, apart from the elements described, may conform to the usual practice in the art.

With reference to Fig. 3, a modified device is shown for treating a substance in a comparatively thin film with the desired active rays. Where the substance is opaque or partially opaque, it is necessary, as hereinbefore described, to treat all portions thereof uniformly. It is contemplated to effect the successive treating of portions of substances of this character, such treated portions being mixed with untreated portions between the successive treating steps in order that the resulting process provides a substance which is relatively uniformly treated. Thus, in Fig. 3, a container 38, shown as cylindrical, is provided with baffles 39, disposed radially within the container and extending outwardly from the outer wall thereof. A series of radial baffles 40 is mounted within the container, these baffles lying between the respective baffles 39 and being spaced from the outer wall 38 as at 41. The foregoing baffles are alternately spaced within the container to direct the flow of the substance to be treated in a circuitous path, repeatedly directing such substance to that portion of the container which is provided with the active rays.

A tube 42, of quartz or other suitable material, is disposed axially of the housing in contact with the inner ends of baffles 40. Within this tube a source of ultra-violet rays 43 is mounted so that rays therefrom are directed through the tube 42 to treat the substance flowing between the baffles. There does not result from the above treatment any over-treatment of the surface of the substance in order to provide proper treatment of the entire substance.

With reference to Fig. 4, there is shown a construction in which a fewer number of baffles is used. These baffles are shown at 44 and are directed inwardly in a radial manner. Diametrically opposed outwardly projecting baffles 45 are mounted within the casing and spaced from the exterior of the housing 46 as at 47. The quartz enclosure 48 is similar to that shown in Fig. 3 and the source of active rays is indicated at 49. The inner ends of baffles 44 are flared outwardly as indicated at 50, a spacing 51 being provided between the cylindrical surfaces of the flared portions 50 and the enclosure 48. The foregoing structure causes portions of the substance treated to be exposed to the influence of the active rays over a relatively extended portion of the enclosure 48.

Our method relates to the irradiation of substances capable of having beneficial or detrimental effects imparted thereto and comprises treating such a substance with a number of short intermittent exposures to radiant energy emanating from one or more sources or stages of active rays, no one of said exposures being sufficient to give the whole body of the substance the amount of treatment necessary to produce the ultimate desired beneficial results or effects, and mixing the substance between exposures, such that said mixings take place away from the action of the rays to permit one to control the distribution and amount of treatment received by the substance. The proper combination of the time of each exposure or amount of treatment and the number of exposures will give a much better result than that obtained if the same total time of treatment were given without regard to the amount of each exposure. The number of treatments to be given depends on the layer thickness used, the time limits of exposure and the amount of desirable or beneficial effects desired and the amount of undesirable effects that may be tolerated.

To practice our method it is necessary to understand two important principles thereof, namely, first, the minimum total time of exposure or the minimum amount of treatment required to impart beneficial properties or effects to a substance, and, second, the maximum total time of exposure or the maximum amount of treatment to which said substance may be subjected before undesirable, detrimental effects are produced therein. With this understanding our invention, in one of its broad aspects, comprises exposing a substance to the influence of active rays of sufficient effectiveness and for such duration as to give the same a fractional treatment and to impart beneficial effects thereto but for a duration insufficient to impart undesirable effects thereto, mixing said substance after such fractional treatment, and then alternately repeating this cycle until the desired beneficial effects throughout the substance have been attained, these repetitions being less than that required to impart detrimental effects thereto. The layer thickness used for the treatment will depend, among other things, upon the character of the substance itself. A clear knowledge of this method, as hereinafter set forth, will indicate what layer thickness should be used in each individual irradiating case.

We have found that it is very important to so irradiate a substance that the amount of irradiation or treatment received by different portions of the substance may be carefully and accurately controlled between certain fixed limits above described. For example, in the treatment of milk, if the treatment is not accurately controlled one may impart to the milk only a small percentage of the potential vitamin D effect, which is beneficial, and at the same time destroy vitamins naturally present in the milk which may be just as important or even more important than vitamin D. Also, one may injure the taste or odor of the milk to such an extent that the milk cannot be used for human consumption, or it is said one may destroy a large portion of the vitamin D previously produced, all of which are detrimental effects caused by the treatment.

We have also found that it takes a lesser amount of treatment to produce vitamin D in milk than it does to produce changes in the taste or odor of the milk. Indeed, we have found, as will be hereinafter explained, that the time of exposure necessary to produce the vitamin D effect is much shorter than the times mentioned by other workers in the literature on the subject. Some workers report times of exposure varying from eight seconds up to several minutes and even hours. We have in our experiments produced the vitamin D effect in milk with an exposure which was about one twentieth (1/20th) of a second, and in some cases we have produced the effect with even a shorter time of exposure. We have also found that some types of bacteria are killed with an exposure of about one two-hundredth (1/200th) of a second or even less, while working at a distance of one and one quarter inches from a ray source, as will be hereinafter described. We have also found that the amount of irradiation required to kill harmful germs in milk is less than the amount of irradiation necessary to cause a change in taste and odor. We have found that there is a considerable difference between the amount of treatment required to produce vitamin D and the amount of treatment required to destroy it, if it can be destroyed. Our method therefore contemplates accurately controlling the irradiation of a body of milk or other substances, to produce, to a high degree, beneficial properties therein with a minimum amount of harmful effects, if any.

By extensive experimentation we have discovered certain general rules of treating which are readily adapted to commercial treatment of various substances capable of having beneficial or detrimental effects imparted thereto. For example, we have found it is well to irradiate milk by moving it through the field of ultraviolet rays having an intensity in proportion to the concentration of the element to be affected by the treatment. We have treated milk with rays of various intensities and have found that good results, for example, are obtainable at a distance of about one and one quarter inches from a source of ultra-violet rays, which was a 220 volt hot anode type direct current quartz mercury vapor arc. The arc length in this case was six inches and the diameter of the luminous tube five eighths of an inch, and the operating volts 170, and the current 3.5 amperes and only rays from the central three inches of the arc were used. It will be understood, however, that other sources of active rays or radiant energy may be use. The intensity and wave lengths produced under the condition outlined gave excellent irradiating results when irradiating milk with our method.

We have treated some such substances by keeping them comparatively cold; others we have treated while comparatively hot. Our method is one which can be applied to various substances, and the temperatures therefore may vary with the problem at hand. It will be understood that our method pertains to the control of the amount of irradiation received by different portions of the substance, whether or not the substance is heated or cooled during the treatment. However, changes in the temperature of some substances will change the limits of the period of irradiation or the amounts of treatment to be considered.

In the consideration of the application of our method it should be remembered that active rays such as ultra-violet rays of different wave lengths have different penetrating qualities in a given substance. In other words, different kinds of wave energy is produced by a 220 volt direct current quartz burner, some of which may be absorbed in a few inches of air, and some of which may be absorbed in but a minute film of the substance to be treated. Other wave energy from the same source may penetrate considerably deeper into the substance. Therefore, at a distance of one and one quarter inches from certain ray sources one will have some very effective wave energy available that is not available at a distance of several inches away. The particular medium or media and the condition thereof between the source and the portions of the substance to be treated also have a bearing on the effectiveness of the ray energy which is available for use for the irradiation of the substance. We have discovered that a few or thousands of exposures to radiant energy of short wave lengths may be utilized to produce beneficial effects in a substance when the time of each exposure is only a fraction of a second, as will be hereinafter described.

With our method of irradiation we are able to produce in milk a high degree of the vitamin D effect while using the short wave lengths, i. e., in the region of 2000 A°, and notwithstanding it is stated by others that these short wave lengths are destructive rather than beneficial for vitamin D production. We have found that these short wave lengths are only destructive to the vitamin D factor when used in a manner which does not provide for their accurate control.

It will be noted that our method does not require the use of a film of the substance through which the rays will penetrate, although it may be advisable to irradiate with such a film if it can be produced. If one uses a film thicker than that through which the rays will penetrate, all of the energy entering the substance will be utilized, while if a thin film is used a portion of the energy is wasted. It will be noted also that in our method the substance is agitated or mixed after it is removed from the action of the rays. The mixing or agitating may be performed in any one of a number of ways although we have found that the mixing accompanying the treatment of a substance during a plurality of passes through a single machine, or through a series of machines, as set forth in our pending application serial No. 418,027, now Patent No. 2,024,207, above referred to, is sufficiently effective to accomplish satisfactory commercial results with many substances. It will be understood, for example, that when we refer to the step of mixing in our method that this mixing may be accomplished by conducting the substance to be treated through a conduit to and from the source of treatment.

In the irradiation of many substances, such as milk, we have learned that it is highly desirable for practical reasons to treat it in a moving stream preferably in the form of a layer less than about one-half inch in thickness. But even with a stream of this character it is well known that under the most favorable conditions there is constantly taking place at least a certain amount of incipient agitation or mixing of the various particles which go to make up the stream. The amount of mixing would depend on the thickness of the layer, the distance the stream runs and other flow conditions. It is because of the recognition of these facts that in dealing with a moving stream of liquid we have resorted to an exposure or exposures of short duration, because the more the time of exposure is reduced the more the milk or other liquid substance simulates a body of liquid at rest in a container.

With respect to the irradiation of milk our invention is not necessarily limited to the production of vitamin D potency in excess of that which others have heretofore attained but rather is specifically directed, inter alia, to the production of the vitamin D effect without detrimental effects in an efficient manner by the novel process of treating the milk by a single exposure while no substantial mixing takes place therein, and this is contrary to all the teachings of the art. By utilizing the principle of first treating free from substantial mixing and then mixing the treated and untreated portions we are enabled to irradiate milk of the usual degree of potency of about 50 units in only a fraction of the time required by others; or stated in another way, we are enabled to irradiate many times the amount which others can irradiate in the same length of time, everything else being equal.

In using our process it is desirable to take into consideration the intensity and wave lengths of the energy at all points in the field of action. Considering, for instance, the surface of the substance being exposed, if we find the intensity at one point of this surface to be lower than the intensity at another point, or if the wave lengths are different at different points, it is evident that the rate of flow should be faster where the high intensity or more powerful wave lengths exist than where the low intensity or weaker wave lengths exist, to effect a uniform treatment of the surface during each exposure. Therefore, a simple method to control one element effecting the amount of treatment given to a substance, is to work in a field of rays of uniform intensity having similar wave lengths. The amount of treatment received by particles the same distance from the source will then be about the same for each exposure and once the characteristics of the substance to be treated are understood, the amount of treatment received is a function of the time of exposure. The time of exposure for any part of a substance cannot be computed without a consideration of the particular wave lengths available, as well as the intensity of said rays at the point of utilization. However, it will be hereinafter seen that good results may be, obtained with our method even if the above directions are not precisely followed. In a general way it can be said that instead of trying to irradiate the complete layer of a substance in one exposure, as is done by those using a thin film or thin stream or by those who agitate while under the action of the rays, we only try to beneficially irradiate a relatively small portion, or, you might say, the surface of the layer or film and then mix the substance while it is away from the action of the rays and thereafter return it again for treatment, repeating the cycle for as many treatments as are necessary to give the results desired. These repeated treatments are not necessary or essential in the irradiation of milk for the vitamin D effect since, as heretofore and hereinafter pointed out, we have found that with milk we can produce a substantial increase in the vitamin D effect with a single exposure for a fraction of a second.

We have discovered that this cyclic method of giving a substance fractional or several properly time short intermittent exposures (in place of one continuous exposure) for a given number of times and mixing between exposures gives us excellent results. We have found that with a given amount of active ray energy to be applied to a substance, the amount of beneficial effect imparted to a substance varies with the number of treatments given. We have also found that as a rule, the number of treatments to which a substance may be safely subjected depends upon the relation between the amount of treatment required to deleteriously affect the substance and the minimum amount of treatment necessary to produce a beneficial effect in said substance. If the time of each exposure is too long, or the amount of treatment too great, then one is obliged to reduce the number of exposures in order to avoid detrimental effects, and consequently the amount of beneficial effects will be less than if shorter exposures and more of them were used.

According to the teachings herein, the time of each exposure, or the amount of treatment given during each exposure, may be readily predetermined by actually treating and testing samples of the particular substance to be treated. Likewise, the time intervals between exposures may be readily predetermined. This is particularly important in sterilizing, because if the time intervals are too great it will enable bacteria to recuperate from the effects of any preceding exposure or exposures. We have found, as already stated, that the layer thickness used when the substance is presented for irradiation has a bearing on the number of exposures to be given and the time of each exposure. We have also found that the degree of mixing given between exposures will also vary the results. Thorough mixing between exposures gives the most accurate control of the amount of treatment and therefore the best results. However, this degree of mixing may not be necessary in cases where the character of the substance does not require it, or because the maximum results are not desired.

We offer below a possible explanation of our method which we have found to conform closely with data obtained from experiments with different substances.

Suppose it is desired to irradiate to kill *B. coli* in a certain substance with ultra-violet ray treatment, which substance is susceptible of being detrimentally affected by such treatment and that these detrimental effects cannot be tolerated even in the slightest degree. Suppose further that a layer of the substance can be produced which under actual treatment with rays of a given intensity and given wave lengths, shows a killing effect of 50% of the bacteria in a 1 second exposure and we find that by a continuous exposure of 8 seconds a detrimental effect is produced and a continuous exposure of 7½ seconds does not cause any detrimental effect. This means that if 50% of the B. coli are killed in a 1 second exposure, that the active rays penetrated effectively one-half the depth of the layer, assuming, of course, that the B. coli are evenly distributed.

This substance can be treated by exposing the same to said rays for seven 1 second exposures in a layer of the above mentioned thickness, and mixing between exposures, and the result will be better than if a single exposure of 7 seconds were given. However, the total time of exposure in each case would be seven seconds, and less than the time necessary to cause a detrimental effect. We have found by experiments that this step-by-step treatment of giving several short exposures, with thorough mixings between exposures, will give results approximately as follows:

| Number of treatments | Approximate total percentage of the B. coli killed |
|---|---|
| After 1st treatment of 1 second | 50 |
| After 2nd treatment of 1 second | 75 |
| After 3rd treatment of 1 second | 87 |
| After 4th treatment of 1 second | 94 |
| After 5th treatment of 1 second | 97 |
| After 6th treatment of 1 second | 98 |
| After 7th treatment of 1 second | 99 |

It is seen from the above that about 99 per cent of the B. coli are killed with 7 treatments of 1 second each.

Now, when each exposure is of 2½ seconds' duration, it is only safe to make three exposures, since the total time of exposure must not exceed 7½ seconds. Our experiments show that the killing is not as great with three exposures of 2½ seconds each as when 7 exposures of 1 second each are given. We have also found from experiments that in order to avoid detrimental effects and get the maximum beneficial effect, one should use a given time of exposure for each exposure, which time is dependent on the particular substance being treated. It has already been pointed out that the time of each exposure, or the amount of treatment given during each exposure, may be readily predetermined by actually treating and testing samples of the particular substance to be treated. The number of treatments to be given, the time intervals between treatments, and therefore the accuracy of the control necessary, must likewise be predetermined. The best combinations of the time of exposure, or the amount of treatment, and the number of treatments in relation to the layer thickness, are also predetermined by actual trials. According to the teachings herein, it is relatively simple to test samples with a fair degree of accuracy and thus establish data by which our method may be practiced in connection with any particular substance to be treated.

It will be seen that this substance containing B. coli is such that if one treats it seven times for one second each time, some of the substance will receive seven seconds of exposure, but we have found that the amount of substance receiving a total of seven seconds of treatment is less with our method than that which would be treated to this extent by the thin film method or by the method which agitates the substance while under the action of the rays, and we, therefore, get a higher degree of beneficial effect with a greater safety factor. It is seen from the above table that we can irradiate the substance with four exposures of one second each and realize about 94 per cent or more killing of B. coli, and this with a high safety factor against detrimental effects.

We have found that by using our method of treatment and giving seven exposures of one second each, as described above, that we irradiate only about one per cent of the substance for seven seconds, and consequently only a small portion has approached the upper or danger limit. Now, suppose we had treated the substance with eight treatments of one second each. According to our original assumption an eight-second continuous exposure causes detrimental effects. Now by our method eight one-second exposures would cause only about .5 per cent of the substance to be over-exposed, and in many cases this slight amount of over-treatment would be permissible and thus effect a greater percentage of killing than could possibly be realized with one continuous exposure.

Our method is such that opaque substances which cannot be reduced to a so-called thin layer or thin film can be irradiated to a high degree of effectiveness. We have demonstrated this in experiments where we have sterilized milk to a safe degree in a layer thickness of ⅜ inch. It is generally known that a layer thickness of .01 of an inch is practically opaque to the active rays emanating from a source like that described herein and striking the surface of the milk. Therefore, a ⅜ inch layer is at least thirty-seven times as thick as the layer through which the rays will pass. When we treated milk in this very opaque layer we were able to reduce the bacteria in the milk from a count of over 150,000 per c.c. to 1200 per c.c. after the milk received about 445 exposures and the time of each exposure was a fraction of a second. The milk, therefore, in a very opaque layer was sterilized by our method to a high degree of safety without injuring the taste or odor. Further treatments reduced the bacteria count to zero.

We have also found from biological assays that milk similarly treated obtained a high degree of vitamin D effect with 1/5 the number of exposures. We have also irradiated milk in a layer thickness of 1/32 of an inch for the purpose of producing vitamin D effect. Twenty-five treatments or exposures of the milk in a layer of 1/32 of an inch thickness, where each exposure was for a fraction of a second, gave us a vitamin D content of about 100 standard units per quart, and the milk had no detectable change in taste or odor. We are not yet prepared to say what is the potential maximum vitamin content of milk. We do know, however, that one hundred vitamin D units per quart is a very substantial amount.

We have also found that when the irradiation is properly controlled we can produce in milk a substantial increase in the vitamin D effect with a single exposure of about 1/20 of a second. In one of these experiments the vitamin D content produced was ten units per quart with one exposure 1¼ inches from the ray source above described and in a layer of milk 1/32 of an inch thick over an area of about twenty square inches. When we applied our cyclic method and exposed eight times with short exposures of 1/20th of a second each time, we obtain a substantial increase in the number of vitamin D units with each exposure and a high vitamin content at the end of eight exposures.

Now, let us consider another irradiating problem as follows: Suppose the substance to be irradiated is one of such character that the thinnest layer which can be produced is such that it is ten times deeper than that through which the active rays will effectively penetrate. In other words, such a layer of substance may be visualized as ten undefined superimposed thinner layers, each of a depth through which the rays will effectively penetrate. Now, if the substance is exposed a number of times and for a certain fixed time during each exposure, only the undefined thinner layer proximate the ray source, or approximately 10 per cent of the total substance presented will be treated during each exposure. If, after the first exposure the substance is thoroughly mixed, the 10 per cent of the total substance which was treated during the first exposure will be distributed evenly throughout the total amount of the substance and therefore one per cent of the total substance, or $\frac{1}{10}$th of the treated substance will be distributed evenly through each of the ten undefined layers, and when the substance is exposed a second time, another 10 per cent of the total substance will again be treated. The second exposure will treat 9 per cent of the substance for the first time and retreat, so to speak, the 1 per cent that is distributed in the undefined layer proximate the ray source. Hence, at the end of the second exposure a total of 19 per cent of the substance will have been treated, 1 per cent having been treated during both exposures, which leaves 18 per cent of the total substance having received one exposure. This procedure can be carried on to any degree and thus we can reach a point where practically all of the substance is exposed at least once. After nine such exposures and mixings .0000001 per cent would be exposed 9 times
.0000342 per cent would be exposed 8 times
.0000777 per cent would be exposed 7 times
.0067392 per cent would be exposed 6 times
.0802301 per cent would be exposed 5 times
.7440095 per cent would be exposed 4 times
4.463883 per cent would be exposed 3 times
17.217365 per cent would be exposed 2 times
38.73916 per cent would be exposed once
38.7432 per cent would not be exposed at all.

This means that after nine exposures and thorough mixings between exposures about 61 per cent of the substance will be treated.

Now suppose a single one-second exposure of the layer produces 10 per cent of the possible bacteria killing effect in the total amount of the substances presented in the form of a layer, or 100 per cent killing effect in the first of the ten undefined thinner layers above referred to, and an exposure of less than one second caused a practically negligible killing effect. Suppose further that 10 seconds of continuous exposure produced an undesirable effect on the substance, for example, changed its taste and odor, and nine seconds did not. Since nine treatments of one second each will not injure the substance it will be seen from the above that about 61 per cent of the bacteria is killed without producing an undesirable effect therein.

Now suppose that we use an exposure of $\frac{1}{2}$ second each time and expose for eighteen times. This will cause about 85 per cent of the material to receive some exposure to the active rays and about 30 per cent of this would only receive one exposure of $\frac{1}{2}$ second, leaving 55 per cent of exposed material which had been exposed between 1 and 9 seconds. Since, in the problem at hand, $\frac{1}{2}$ second is not enough to produce a safe killing effect, we have accomplished only a 55 per cent killing effect in the substance by the combination of 18 exposures of $\frac{1}{2}$ second each. This is a lower percentage than we realized by 9 exposures of 1 second each. This, however, does not mean that exposures of less than $\frac{1}{2}$ second would give less than 55 per cent killing effect, as will be explained below.

Now suppose we had used exposures of $4\frac{1}{2}$ seconds each time. The killing effect will not be greater on the proximate thinner layer because one cannot do more than kill all the bacteria. However, in this case we cannot expose more than twice without giving a total exposure of more than nine seconds. This combination would give us only 19 per cent killing effect, namely, 10 per cent for the first exposure and 9 per cent for the second exposure as stated above.

From this data it is clear that the duration of treatment for each exposure and the number of exposures must be determined for any given substance to realize the beneficial effect desired. The particular layer thickness used in the treatment has a bearing on the results that can be obtained because our method is not simply a matter of giving successive exposures but the time or amount of treatment received during each exposure must be considered. For example, we have shown that a variation of from 19 per cent to 61 per cent killing effect could be obtained with a total exposure of 9 seconds by merely varying the time of each exposure and the number of exposures. 9 seconds' time of exposure is the limit of time specified in the example stated which must be considered to prevent detrimental effects.

We wish to call attention to the fact that in killing bacteria, in cases where one second of exposure will kill a germ and $\frac{1}{2}$ second will not, the use of two exposures of $\frac{1}{2}$ second in some cases gives about the same effect of killing as a single one-second exposure. This therefore permits the use of a single exposure of less than the time required to produce the full effect and the appreciation of this fact is advantageous in many applications of our method. We, however, wish to call attention to the fact that this minimum time of exposure probably has a limit beyond which we cannot go because the recuperative power of bacteria may be too rapid for the destructive effect of some short exposures, considering the elapsed time between exposures. This cumulative effect may also hold true in regard to other effects, but we are not prepared to make a statement on this as yet. If several fractional exposures of short duration do not have a cumulative chemical or other effect as is true of bacteria, this fact points the way for using our method of bacteria destruction without causing any chemical effect, namely, the use of exposures so short that their cumulative effect does not cause a chemical change, and yet is long enough so that the cumulative effect will kill the germs. Our method permits the treatment of a substance in such a manner.

Another possible explanation of the unexpected results obtained by our method of irradiation is the residual effect of irradiation. It appears to us that our method is an excellent one for the utilization of any residual effect of irradiation and this may be another reason why we have obtained certain seemingly impossible results.

In practicing our method, we prefer to use apparatus such as, or similar to, that shown in our copending application above referred to, Serial No. 418,027, now Patent No. 2,024,207 and in our copending application Serial Number 567,574, filed October 8, 1931, to which applications reference is hereby made. By using apparatus of this character the process may readily be carried out, if desired, without substantial exposure to atmospheric air which, inter alia, is not only desirable to avoid contamination of the substance being treated, but sometimes necessary as where the exposure to air of the substance being treated will cause chemical action to be set up in the substance or other deleterious effects to ensue.

In the foregoing description of our invention, it will be understood that when we mention vitamin D units or standard vitamin D units, we are speaking of Steenbock units.

Having particularly described our method of treatment, it will be apparent that the same is applicable to the treatment of many substances not mentioned herein. Substances which are specifically mentioned, are referred to merely by way of example and without any intention of limiting ourselves to the treatment of only such substances. Our method of treatment may be used, therefore, in the treatment of many other substances without departing from the spirit and scope of our invention as defined by the appended claims.

What we claim is:

1. The method of treating while in a state capable of being mixed a partially opaque substance with ultra-violet rays which substance is also capable of having desirable properties imparted thereto when said substance is exposed to a given amount of said treatment and which is also capable of having undesirable properties imparted thereto when said substance is exposed to a greater amount of said treatment, comprising treating a body of said substance at rest by exposing the same to the influence of said rays to impart beneficial properties to only a fractional portion of the substance forming said body, discontinuing said treatment when only said fractional portion of the body has been treated, mixing the treated portion of the substance forming said body with the untreated portion thereof while said treatment is discontinued, and thereafter alternately beneficially treating fractional portions of said mixed body with said active rays as aforesaid, and mixing the substance after each treatment, as aforesaid, until the summation of the amounts of treatment received during the exposures of said fractional portions is less than the time required to impart undesirable properties to any portion of said body.

2. The method of irradiating, while in a state capable of being mixed during said irradiation, a partially opaque substance which is also capable thereby of having beneficial and detrimental effects imparted thereto, which comprises exposing the substance free from substantial mixing during such exposure to the influence of ultra-violet rays of sufficient effectiveness and for such duration as to give to the same a fractional treatment and to impart beneficial effects thereto but for a duration insufficient to impart undesirable effects thereto, mixing said substance after such fractional treatment, and then alternately repeating these steps until the desired beneficial effects throughout the substance have been attained but less than that required to impart undesirable effects thereto.

3. The method of antirachitically activating milk, which comprises exposing the milk free from substantial mixing during such exposure to the influence of ultra-violet rays of sufficient effectiveness and for such duration as to give to the same a fractional treatment and to impart beneficial effects thereto but for a duration insufficient to impart undesirable detrimental effects thereto, mixing said milk after such fractional treatment, and then alternately repeating these steps until the desired beneficial effects throughout the milk have been attained but less than that required to impart undesirable detrimental effects thereto.

4. The method of treating milk by means of ultra-violet rays, which comprises conveying the milk in a moving stream of greater thickness than that through which the rays will penetrate, exposing said moving stream to the influence of said rays of sufficient effectiveness and for such duration as to give to the same a fractional treatment and to impart beneficial effects thereto, but insufficient to impart undesirable effects thereto, the duration being also sufficiently short and operating conditions such that no substantial mixing takes place during such exposure, mixing said milk after such fractional treatment, and then alternately repeating these steps until the desired beneficial effects throughout the milk have been attained but less than that required to impart undesirable effects thereto.

5. The method of irradiating liquid milk to produce the vitamin D effect and any other beneficial effects therein and without imparting undesirable effects thereto, which comprises conveying the milk in a moving stream, intermittently exposing the milk to a beneficially effective amount of ultra-violet ray energy, the duration of each exposure being sufficiently short and operating conditions such that no substantial mixing takes place during such exposure, and mixing the milk between exposures.

6. The method of irradiating a partially opaque liquid substance, in which more or less agitation or mixing is constantly taking place and which is also capable of having beneficial effects and detrimental effects imparted thereto, which comprises exposing said substance a predetermined number of times free from substantial mixing during each exposure and at a predetermined temperature to a predetermined amount of ultra-violet ray energy whilst mixing said substance between exposures.

7. The method of irradiating milk to produce a high percentage of a vitamin D effect and other beneficial effects therein and without imparting any undesirable detrimental effects thereto, which comprises conveying the milk in a moving layer or sheet of uniform thickness but of greater thickness than that through which the rays will effectively penetrate, and exposing said layer or sheet of milk successively at a predetermined number of stages free from substantial mixing during each exposure to a predetermined amount of ultra-violet ray energy whilst mixing the layer or sheet of milk for predetermined time intervals between stages.

8. The method of irradiating a partially opaque substance, capable of being mixed during said irradiation to produce beneficial effects therein and without imparting undesirable effects thereto, which comprises conveying the substance in a moving stream, intermittently exposing the substance to a beneficially effective amount of ultraviolet ray energy, the duration of each exposure being sufficiently short and operating conditions such that no substantial mixing takes place during such exposure, and mixing the substance between exposures.

9. The method of irradiating a partially opaque substance by exposures to ultra-violet rays to produce a beneficial effect therein and without imparting an undesirable effect thereto, which comprises the steps of conveying the substance in a moving stream, in which more or less agitation or mixing is constantly taking place, past a source of ultra-violet rays, and intermittently eliminating the effects of such rays upon such moving stream, the duration of each exposure being sufficiently short and operating conditions such that no substantial mixing takes place during such exposure and the duration of such elimination being sufficiently long to enable substantial mixing of the substance between exposures, and the summation of the amounts of treatment received during such exposures being less than the time required to impart undesirable properties to any portion of said substance.

10. The method of irradiating, while in a state capable of being mixed during said irradiation a partially opaque substance which is also capable thereby of having beneficial and detrimental effects imparted thereto, which comprises exposing in the absence of air the substance free from substantial mixing during such exposure to the influence of ultra-violet rays of sufficient effectiveness and for such duration as to give to the same a fractional treatment and to impart beneficial effects thereto but for a duration insufficient to impart undesirable effects thereto, mixing said substance after such fractional treatment, and then alternately repeating these steps until the desired beneficial effects throughout the substance have been attained but less than that required to impart undesirable effects thereto.

11. The method of irradiating a partially opaque substance, capable of being mixed during said irradiation to produce beneficial effects therein and without imparting undesirable effects thereto, which comprises conveying the substance in the absence of air in a moving stream through a closed container, intermittently exposing the substance while in the container to a beneficially effective amount of ultra-violet ray energy, the duration of each exposure being sufficiently short and operating conditions such that no substantial mixing takes place during such exposure, and mixing the substance between exposures.

12. A method for the irradiation by ultra-violet rays of a partially opaque liquid in which more or less agitation or mixing is constantly taking place and which is also capable of having beneficial and detrimental effects imparted thereto, which comprises forcing the liquid in a confined relatively thin layer through treating zones of a closed container and in a confined relatively thick layer through mixing zones of said container, treating said thin layers with ultra-violet rays in such a manner that only the portion of said relatively thin layer proximate the source of said ultra-violet rays is exposed for a time necessary to produce a beneficial effect but for less time than would cause a detrimental effect in said proximate portion and substantially no effect in the remote portion of said thin layer whereby no substantial mixing takes place during each treatment, and between successive treating steps mixing in said mixing zones said treated portion of said thin layers with the untreated portion thereof.

13. The method of antirachitically activating milk by means of ultra-violet rays without imparting undesirable detrimental effects thereto, which comprises the steps of conveying the milk in a moving layer thicker than that through which the rays will effectively penetrate during such movement, and, during such movement, exposing the portion of said layer proximate the ray source to a beneficially effective amount of ultra violet ray energy, said layer being of such thickness as to enable the treatment of such a fraction thereof that the desired potency is obtained in the total volume of milk conveyed when said proximate beneficially affected portion is mixed with the remote portion thereof, and the duration of such exposure being sufficiently short and operating conditions such that no substantial mixing takes place during such exposure, and thereafter mixing the beneficially affected and remote portions of said milk.

14. The method of antirachitically activating milk by means of ultra-violet rays without imparting undesirable detrimental effects thereto, which comprises the steps of conveying the milk in a moving layer thicker than that through which the rays will effectively penetrate during such movement, and, during such movement, exposing said layer proximate the ray source to a beneficially effective amount of ultra-violet ray energy for only a fraction of a second and with operating conditions such that no substantial mixing takes place during such exposure, said layer being sufficiently thin to enable such a fraction thereof to be beneficially treated which, when mixed with the remote portion thereof, the desired potency is obtained in the total volume of milk conveyed, and thereafter mixing the treated with the untreated portions of said milk.

15. The method of antirachitically activating milk by means of ultra-violet rays without imparting undesirable detrimental effects thereto, which comprises the steps of conveying the milk in a moving layer thicker than that through which the rays will effectively penetrate during such movement, and, during such movement, exposing the portion of said layer proximate the ray source to a beneficially effective amount of ultra-violet ray energy, in the absence of air, said layer being of such thickness as to enable the treatment of such a fraction thereof that the desired potency is obtained in the total volume of milk conveyed when said proximate beneficially affected portion is mixed with the remote portion thereof, and the duration of such exposure being sufficiently short and operating conditions such that no substantial mixing takes place during such exposure, and thereafter mixing the beneficially treated and remote portions of the milk.

16. The method of irradiating milk with ultra-violet rays to produce the vitamin D effect therein and without imparting undesirable effects thereto while flowing said milk in a layer thicker than that through which the rays will effectively penetrate during the irradiation period to ultimately produce in the whole layer of said milk conveyed a beneficial effect without causing undesirable detrimental effects therein, characterized by the steps of flowing said milk through a field irradiated by ultra violet rays of such intensity and with flow conditions such that during the period of irradiation necessary to cause a beneficial effect in the milk the irradiated layer is not substantially mixed and thereafter mixing said milk while it is not being effectively irradiated by said rays.

17. The method of irradiating milk to produce the vitamin D effect therein and without imparting undesirable effects thereto, which comprises the steps of conveying the milk in a moving stream thicker than that through which the rays will effectively penetrate, exposing the milk during such movement to a beneficially effective amount of ultra-violet ray energy, the duration of such exposure being sufficiently short and operating conditions such that no substantial mixing takes place during such exposure, and thereafter mixing the exposed with the unexposed portions of said milk.

18. The method of irradiating milk to produce the vitamin D effect therein and without imparting any undesirable detrimental effects thereto, which comprises the steps of conveying the milk in a moving stream thicker than that through which the rays will effectively penetrate, exposing the milk during such movement to ultra-violet rays for only a fraction of a second and with operating conditions such that no substantial mixing takes place during such exposure, and thereafter mixing the exposed with the unexposed portions of the milk.

19. The method of irradiating, while in a state capable of being mixed during said irradiation, a partially opaque substance also capable of having beneficial effects and undesirable detrimental effects imparted thereto which comprises, exposing the substance free from substantial mixing during such exposure to a predetermined amount of ultra-violet ray energy, thereafter mixing said substance, and then alternately repeating these steps at predetermined time intervals until the desired beneficial effects throughout the substance have been attained.

EDWARD C. BERNDT.
HARRY M. CREIGHTON.

CERTIFICATE OF CORRECTION.

Patent No. 2,072,416.            March 2, 1937.

EDWARD C. BERNDT, ET AL.

It is hereby certified that error appears in the printed specification of the above numbered patent requiring correction as follows: Page 1, second column, line 49, strike out the words "irradiating a substance wherein maximum" and insert the words active ray energy is utilized to produce the; page 4, column 2, line 1, for "use" read used; page 5, second column, line 19, for "time" read timed; page 8, second column, line 71, claim 8, after "irradiation" insert a comma; and that the said Letters Patent should be read with these corrections therein that the same may conform to the record of the case in the Patent Office.

Signed and sealed this 8th day of June, A. D. 1937.

Henry Van Arsdale (Seal)           Acting Commissioner of Patents.

Disclaimer 2,072,416.—*Edward C. Berndt*, Norwalk, and *Harry M. Creighton*, East Norwalk, Conn. METHOD OF IRRADIATING SUBSTANCES WITH ACTIVE RAYS. Patent dated Mar. 2, 1937. Disclaimer filed Dec. 8, 1948, by the assignee, *The R. U. V. Engineering Corporation*.

Hereby enters this disclaimer to claims 13 to 18 inclusive of said patent.

[*Official Gazette January 4, 1949.*]

said milk while it is not being effectively irradiated by said rays.

17. The method of irradiating milk to produce the vitamin D effect therein and without imparting undesirable effects thereto, which comprises the steps of conveying the milk in a moving stream thicker than that through which the rays will effectively penetrate, exposing the milk during such movement to a beneficially effective amount of ultra-violet ray energy, the duration of such exposure being sufficiently short and operating conditions such that no substantial mixing takes place during such exposure, and thereafter mixing the exposed with the unexposed portions of said milk.

18. The method of irradiating milk to produce the vitamin D effect therein and without imparting any undesirable detrimental effects thereto, which comprises the steps of conveying the milk in a moving stream thicker than that through which the rays will effectively penetrate, exposing the milk during such movement to ultra-violet rays for only a fraction of a second and with operating conditions such that no substantial mixing takes place during such exposure, and thereafter mixing the exposed with the unexposed portions of the milk.

19. The method of irradiating, while in a state capable of being mixed during said irradiation, a partially opaque substance also capable of having beneficial effects and undesirable detrimental effects imparted thereto which comprises, exposing the substance free from substantial mixing during such exposure to a predetermined amount of ultra-violet ray energy, thereafter mixing said substance, and then alternately repeating these steps at predetermined time intervals until the desired beneficial effects throughout the substance have been attained.

EDWARD C. BERNDT.
HARRY M. CREIGHTON.

CERTIFICATE OF CORRECTION.

Patent No. 2,072,416.  March 2, 1937.

EDWARD C. BERNDT, ET AL.

It is hereby certified that error appears in the printed specification of the above numbered patent requiring correction as follows: Page 1, second column, line 49, strike out the words "irradiating a substance wherein maximum" and insert the words active ray energy is utilized to produce the; page 4, column 2, line 1, for "use" read used; page 5, second column, line 19, for "time" read timed; page 8, second column, line 71, claim 8, after "irradiation" insert a comma; and that the said Letters Patent should be read with these corrections therein that the same may conform to the record of the case in the Patent Office.

Signed and sealed this 8th day of June, A. D. 1937.

Henry Van Arsdale (Seal)  Acting Commissioner of Patents.

Disclaimer 2,072,416.—*Edward C. Berndt*, Norwalk, and *Harry M. Creighton*, East Norwalk, Conn. METHOD OF IRRADIATING SUBSTANCES WITH ACTIVE RAYS. Patent dated Mar. 2, 1937. Disclaimer filed Dec. 8, 1948, by the assignee, *The R. U. V. Engineering Corporation*.

Hereby enters this disclaimer to claims 13 to 18 inclusive of said patent.

[*Official Gazette January 4, 1949.*]

CERTIFICATE OF CORRECTION.

Patent No. 2,072,416.                                              March 2, 1937.

EDWARD C. BERNDT, ET AL.

It is hereby certified that error appears in the printed specification of the above numbered patent requiring correction as follows: Page 1, second column, line 49, strike out the words "irradiating a substance wherein maximum" and insert the words active ray energy is utilized to produce the; page 4, column 2, line 1, for "use" read used; page 5, second column, line 19, for "time" read timed; page 8, second column, line 71, claim 8, after "irradiation" insert a comma; and that the said Letters Patent should be read with these corrections therein that the same may conform to the record of the case in the Patent Office.

Signed and sealed this 8th day of June, A. D. 1937.

Henry Van Arsdale (Seal)                                         Acting Commissioner of Patents.

Disclaimer 2,072,416.—*Edward C. Berndt*, Norwalk, and *Harry M. Creighton*, East Norwalk, Conn. METHOD OF IRRADIATING SUBSTANCES WITH ACTIVE RAYS. Patent dated Mar. 2, 1937. Disclaimer filed Dec. 8, 1948, by the assignee, *The R. U. V. Engineering Corporation*.

Hereby enters this disclaimer to claims 13 to 18 inclusive of said patent.

[*Official Gazette January 4, 1949.*]